United States Patent [19]

Kuwayama et al.

[11] Patent Number: 4,610,336

[45] Date of Patent: Sep. 9, 1986

[54] AUTOMATIC TRANSMISSION LOCKING MECHANISM FOR PARKING

[75] Inventors: Yoshinari Kuwayama; Masakatsu Miura, both of Anjo; Kunio Morisawa, Toyota, all of Japan

[73] Assignees: Aisin-Warner K.K., Anjo; Toyota Jidosha K.K., Toyota, both of Japan

[21] Appl. No.: 498,912

[22] Filed: May 27, 1983

[30] Foreign Application Priority Data

May 28, 1982 [JP] Japan ................. 57-091725

[51] Int. Cl.$^4$ .............................. B60K 41/26
[52] U.S. Cl. ................... 192/4 A; 188/31; 188/72.7
[58] Field of Search ............ 192/4 A, 4 R; 74/411.5, 74/710.5, 99 A, 107, 569; 188/31, 60, 69, 72.7, 72.9

[56] References Cited

U.S. PATENT DOCUMENTS 2,954,103 9/1960 Sand ................................ 192/4 A
3,116,815 1/1964 Chapman ..................... 192/4 A X
3,952,838 4/1976 Osten et al. .................... 192/4 A Primary Examiner—George H. Krizmanich
Attorney, Agent, or Firm—Cooper, Dunham, Griffin & Moran

[57] ABSTRACT

An automatic transmission locking mechanism including a lever rotatively interlocked with a manual shift lever, a rod adapted to be advanced or retracted by the lever, a parking gear, a pawl with a detent having a detent to be engaged with the parking gear, a cam mounted on the rod for pushing up the pawl in shifting the manual shift lever to the parking position, a bracket on which the cam runs and a spring for releasing the pawl from the parking gear and for retaining the pawl at the released position, wherein the pawl is rotatably supported on a shaft of a reduced length and the spring is disposed near the free end of the pawl within a plane in which the pawl is turned on the shaft and thereby the locking mechanism is formed in a compact construction and is suitably applicable to a front-engine front-drive vehicle.

2 Claims, 2 Drawing Figures

AUTOMATIC TRANSMISSION LOCKING MECHANISM FOR PARKING

BACKGROUND OF THE INVENTION

1. Field of the Invention

The present invention relates to an automatic transmission locking mechanism for an automatic transmission for a vehicle and more particularly to an automatic transmission locking mechanism for an automatic transmission of a reduced axial dimension for a vehicle.

2. Description of the Prior Art

In most front-engine front-drive automobiles (designated as "FF automobiles" hereinafter), the engine is mounted transversely. Accordingly, the axial dimension of an automatic transmission for an FF automobile is required to be reduced, particularly when the engine is mounted transversely.

Most conventional automatic transmission locking mechanisms interlocked with a manual shift lever employ the following constitution. That is, a lever is joined integrally to a manual shaft which is turned through the manual operation of a manual shift lever, the rear end of a cam rod provided intermediately with a cam is linked to the lever and the free end of a pawl with a detent is pushed up and thereby the pawl is turned about the axis of turning thereof when the cam is caused to run on a slope formed in a bracket supporting the front portion of the cam rod extending formed from the cam, whereby the detent engages with a parking gear fixed to the output shaft of the transmission to lock the output shaft. A spring mechanism is included in the automatic transmission locking mechanism to retain the pawl with the detent at the released position while the vehicle is running in order to prevent the accidental contact between the detent and the parking gear during running. According to the prior art, such a spring mechanism has been constituted in a form in which the pawl with the detent is retained by the resilience of a torsion spring mounted round a shaft on which the pawl is turned and engaged at one end thereof with the pawl and at the other end thereof with a case. However, such a conventional spring mechanism required a shaft of an increased length for the pole to mount a torsion spring and hence an increased axial dimension of the mechanism and a strong spring. Furthermore, provision of the torsion spring on the shaft on which the pawl is turned (designated as "the pole shaft" hereinafter) requires difficult work in fitting the pawl on or in removing the pole from the pawl shaft.

SUMMARY OF THE INVENTION

Accordingly, it is an object of the present invention to provide an automatic transmission locking mechanism having a pawl with a detent and a pole shaft of a reduced axial length, formed in a compact construction and suitably applicable to an automatic transmission for an FF automobile.

An automatic transmission locking mechanism according to the present invention, includes a lever rotatively interlocked with a manual shift lever, a rod adapted to be advanced or retracted by the lever, a parking gear, a pawl with a detent having a detent to be engaged with the parking gear, a cam mounted on the rod for pushing up the pawl with the detent in shifting the manual shift lever to the parking position, a bracket on which the cam runs and a spring for releasing the pawl from the parking gear and for retaining the pawl at the released position, wherein the pole is adapted to be turned on a pawl shaft, a plate-shaped clamp is fitted in a groove formed in the pawl shaft at the free end thereof to restrain the axial movement of the pawl, the clamp is fixed to a case with a bolt, the spring is disposed nearby the free end of the pawl and the pole can easily be fitted on or removed from the pawl shaft by fastening or removing, respectively, the bolt fixing the clamp.

Other objects and features of the present invention will become apparent from the description of the preferred embodiment thereof, taken in connection with the accompanying drawings.

DESCRIPTION OF THE PREFERRED EMBODIMENT

Figure 2:
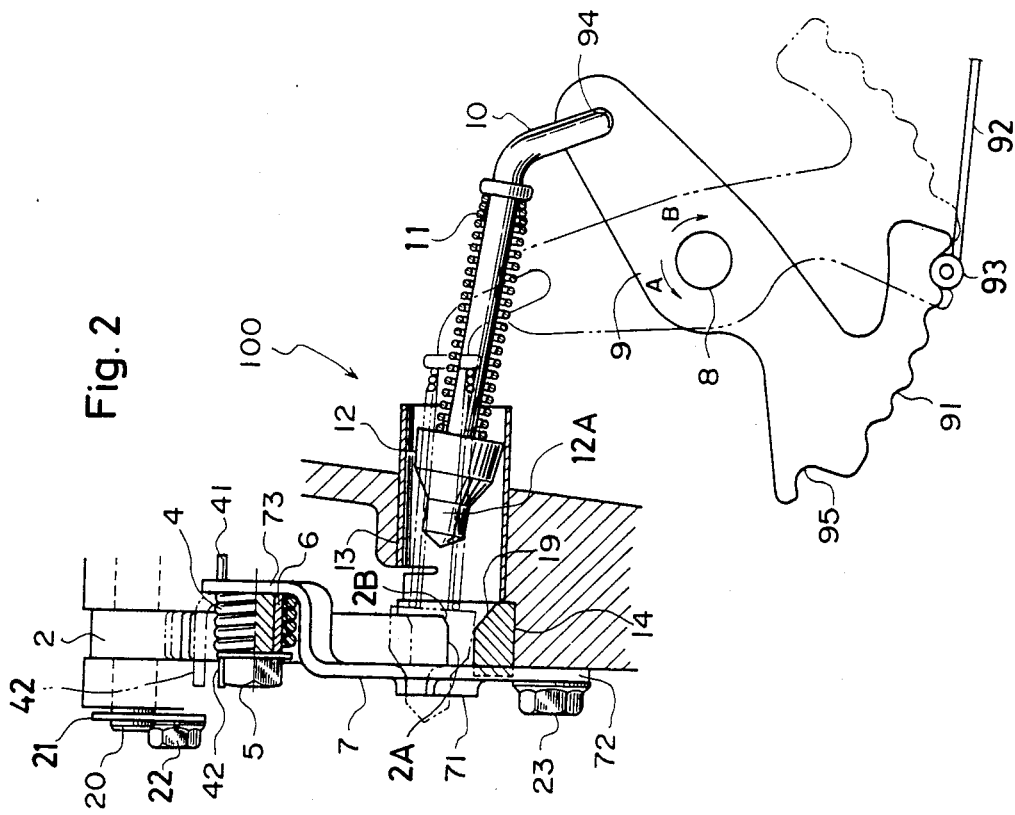
FIG. 2 is a side view of the automatic transmission locking mechanism of FIG. 1, for facilitating the description of the operation thereof.
Figure 1:
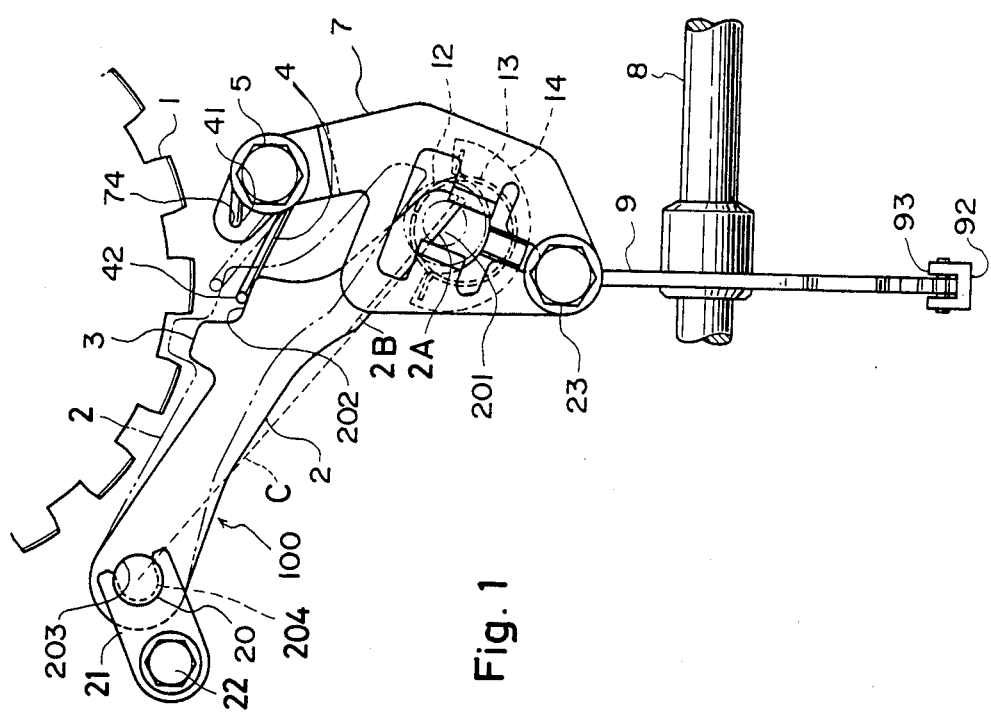
FIG. 1 is a front view of an automatic transmission locking mechanism according to the present invention, for facilitating the description of the operation thereof.

Referring to FIGS. 1 and 2, an automatic transmission locking mechanism 100 includes a detent lever 9, a rod 10, a cam 12, a sleeve 13, a bracket 14, a pawl 2 with a detent, a torsion spring 4, a support plate 7 and a parking gear 1.

The detent lever 9 is a plate-shaped member fixed to a manual shaft 8 rotatively interlocked with a manual shift lever, not shown, provided beside the driver's seat and adapted to be turned on the manual shaft 8. A plurality of notches 91 are formed in the circular edge of the detent lever 9 at positions corresponding to the shift positions (in this embodiment, six positions corresponding to parking, neutral, drive, 3rd and low shift positions) respectively. The free end 93 of a detent spring 92 engages with those notches 91 as the detent lever 9 is turned. The rear end of the rod 10 is rotatably fitted in a hole 94 formed in the detent lever 9 opposite to the circular edge having the notches 91.

The rod 10 is pushed forward as the detent lever 9 is turned in the direction of the arrow A. The cam 12 is axially slidably fitted on the rod 10 in the front end portion thereof and is adapted to be biased forward with a coil spring 11 mounted round the rod 10, to form a cam rod. As the rod 10 is pushed forward, the coil spring 11 pushes the cam 12 forward along the rod 10. The cam 12 has a conical surface of a sharp conical angle and a conical surface of an obtuse conical angle each being tapered toward the front end of the rod 10. The cam 12 is guided by and advanced within the tubular sleeve 13 as the detent lever 9 is turned in the direction of the arrow A and finally enters a case. Then, the cam 12 runs on a slope 19 formed in the semicircular bracket 14 fixed to the case with the plate 7 and bolts 5 and 23 and is forced into a gap formed between the bracket 14 disposed in front of the sleeve 13 and the free end portion of the pawl 2 having the detent 3, whereby the pawl 2 starts rising from a position indicated by continuous line. Upon the entrance of the free end 93 of the detent spring 92 into a notch 95 corresponding to the parking position of the manual shift lever, the cam 12 rides on top of the slope 19 of the bracket 14, whereby the pawl 2 is turned on its shaft to a position indicated by alternate long and two short dashes line.

The pole 2 having the detent 3 is a bar-shaped member of a predetermined curved form having a cam engaging surface 201 formed in the free end portion thereof for engagement with the cam 12, the detent 3 formed in the intermediate portion thereof, a seat 202 formed near the detent 3 on the side of the free end of the member with respect to the detent 3 for receiving one end of the torsion spring 4 and a hole 203 formed at the other end thereof for receiving a support shaft, that is, a pawl shaft 20, therethrough.

Since the cam engaging surface 201 consists of a plane 2A extending in the direction of a normal line intersecting the center axis of the pawl shaft 20 (the direction indicated by broken line C) and an inclined surface 2B, only minute slip in a direction perpendicular to the direction of the advancement of the cam 12 occurs between the cam 12 and the cam engaging surface 201, when the cam 12 pushes up the free end of the pawl 2.

The pole 2 is rotataly fitted on the pawl shaft 20 at the hole 203 and a plate-shaped clamp 21 fixed to the case with a bolt 22 is inserted into a groove 204 formed in the free end portion of the pawl shaft 20 to restrain the axial movement of the pawl 2. In this instance, clamp 21 has an arcuate opening at one end. Clamp 21 at the arcuate opening is set into groove 204 of shaft 20 to support shaft 20 and at the same time securing against the removal of pawl 2.

This constitution facilitates mounting the pawl 2 on and removing the pole 2 from the pawl shaft 20 through fixing the plate-shaped clamp 21 to the case with the bolt 22 and removing the same by unfastening the bolt 22 respectively.

The pawl 2 is turned on the pole shaft 20 fitted in the hole 203 formed in the other end portion of the pawl 2 in a direction perpendicular to the direction of the advancement of the cam 12 toward the parking gear, as the free end thereof is pushed up by the cam 12 and finally the pawl 2 is turned to a position where the detent 3 is engaged with the parking gear 1 to lock the automatic transmission.

In the central portion of the plate 7 is formed, in alignment with the extension of the center axis of the semicircular bracket 14, a hole for receiving the front part 12A of the cam 12 when the automatic transmission is placed in the parking position. The plate 7 is fastened at one end thereof (lower end in the drawing) to the case with the bolt 23. A torsion spring 4 is mounted round a spacer 6 fitted on the body of the bolt 5 fastening the curved other end of the plate 7 (upper end in the drawing), in a plane in which the pawl 2 is turned, with one end 41 inserted into a hole 74 formed in the plate, namely, a finished hole formed in a finished part, and with the other end 42 engaged with the seat 202 formed in the pawl 2 near the detent 3 on the side of the free end of the pawl 2 with respect to the detent 3, to bias the free end of the pawl 2 toward the bracket 14.

The operation of the mechanism in locking or releasing the parking gear 1 will be described hereunder.

When the detent lever 9 is turned manually in the direction of the arrow A as far as the free end 93 of the detent spring engages with the parking range notch 95, the cam 12 rides on top of the bracket 14 to push the free end of the pawl 2 so as to cause the detent 3 of the pawl 2 to engage with the parking gear 1. However, since the mechanism is designed not to allow the detent 3 to engage with the parking gear 1 while the parking gear 1 is turning at a revolving rate over a predetermined revolving rate, the pawl 2 is caused to oscillate on the pawl shaft 20 by the axial vibration of the cam 12 due to the composite effect of the resilience of the torsion spring 4 rotatively biasing the pawl 2 away from the parking gear 1 and the resilience of the coil spring 11 biasing the pawl 2 through the cam 12 toward the parking gear 1. After the revolving rate of the parking gear 1 has been reduced below the predetermined revolving rate, the detent 3 of the pawl 2 is caused to engage with the parking gear 1 by the balance of the force applied to the pawl 2 by the torsion spring 4 to bias the pawl 2 away from the parking gear 1 and the force applied to the pawl 2 by the coil spring 11 to bias the pole 2 toward the parking gear 1, which is greater than the former.

When the detent lever 9 is turned in the direction of the arrow B, while the detent 3 is engaged with the parking gear 1, the resilience of the coil spring 11 becomes insufficient to keep the detent 3 engaged with the parking gear 1 and thereby the pawl 2 is moved away from the parking gear 1 by the effect of the torsion spring 4, to release the parking gear 1.

As described hereinbefore, since only minute slip in a direction perpendicular to the direction of movement of the cam 12 occurs between the cam 12 and the cam engaging surface 201 of the pawl 2, when the cam 12 pushes up the free end of the pawl 2, the wear of the cam 12 resulting from the axial vibration of the cam 12 and the oscillation of the pawl 2 is reduced. After the cam has left the sleeve 13, the plate 7 supports the cam 12.

As described hereinbefore, the automatic transmission locking mechanism according to the present invention includes the detent lever rotatively interlocked with the manual shift lever, the rod adapted to be advanced or retracted by the detent lever, the parking gear, the pawl having the detent to be engaged with the parking gear, the cam mounted on the rod and adapted to push the pawl for turning in shifting the manual shift lever to the parking position, the bracket on which the cam runs and the spring for releasing the pole from the parking gear and for retaining the pole at the released position, wherein the pawl is adapted to be turned on the pawl shaft, a plate-shaped clamp is fitted in the groove formed in the free end of the pawl shaft to restrain the axial movement of the pawl, the clamp is fixed to the case with the bolt, the spring is disposed nearby the free end of the pawl and the pawl can easily be fitted on or removed from the pole shaft by fastening or removing, respectively, the bolt fixing the clamp. Thus the automatic transmission locking mechanism according to the present invention includes a pawl shaft, on which the pawl is turned, of a reduced axial length, is formed in a compact construction and is suitably applicable to an automatic transmission for an FF automobile.

We claim:

1. Parking brake structure for an automatic transmission mechanism comprising a parking gear rotatably mounted on a driven shaft, a pivot shaft having a circumferential groove at the surface and disposed in a hole provided with a stationary member to position in parallel with the driven shaft of said parking gear, a pawl element having one end with a hole disposed in a slot provided with the stationary member and pivotally mounted on said pivot shaft by the pivot shaft disposed in a hole of the pawl element between a locked position in which said parking gear is locked and a released position in which said parking gear is released, a torsion coil spring means positioned within an oscillating plane in which the pawl element pivots to urge the pawl element toward the released position, a clamp member having one end rigidly secured to the stationary member and the other end provided with a bight portion into which said pivot shaft interfit through its groove, a rod member movably mounted in the reciprocating direction perpendicular to the oscillating plane of said pawl element and a cam member secured to the end of said rod member to each pivot said pawl element toward the locked position and released position in combination with the reciprocating movement of said rod member.

2. Parking brake structure for an automatic transmission mechanism as set forth in claim 1 wherein the clamp member is rigidly secured at the end portion opposite to the connecting portion to the stationary member by means of a screw member.

* * * * *